(12) United States Patent
Spielvogel et al.

(10) Patent No.: US 11,034,227 B2
(45) Date of Patent: Jun. 15, 2021

(54) BATTERY STRUCTURE AND PROTECTOR

(71) Applicant: MUBEA CARBO TECH GMBH, Salzburg (AT)

(72) Inventors: Bernhard Spielvogel, Moosbach (AT); Sebastian Schmitz, Salzburg (AT); Guido Insam, Kalsdorf (AT); Herbert Dorfinger, Zell am Moos (AT)

(73) Assignee: MUBEA CARBO TECH GMBH

( * ) Notice: Subject to any disclaimer, the term of this patent is extended or adjusted under 35 U.S.C. 154(b) by 36 days.

(21) Appl. No.: 16/486,387

(22) PCT Filed: Feb. 9, 2018

(86) PCT No.: PCT/EP2018/053354
§ 371 (c)(1),
(2) Date: Aug. 15, 2019

(87) PCT Pub. No.: WO2018/149762
PCT Pub. Date: Aug. 23, 2018

(65) Prior Publication Data
US 2020/0001728 A1 Jan. 2, 2020

(30) Foreign Application Priority Data
Feb. 17, 2017 (CH) .................................. 00186/17

(51) Int. Cl.
*H01M 4/02* (2006.01)
*B60K 1/04* (2019.01)
(Continued)

(52) U.S. Cl.
CPC ................ *B60K 1/04* (2013.01); *B60L 50/64* (2019.02); *B60L 50/66* (2019.02); *B60L 58/26* (2019.02);
(Continued)

(58) Field of Classification Search
CPC ....................................................... H01M 4/02
See application file for complete search history.

(56) References Cited

U.S. PATENT DOCUMENTS

2010/0119927 A1* 5/2010 Bauer ................. H01M 10/617
429/120
2012/0103714 A1 5/2012 Choi et al.
(Continued)

FOREIGN PATENT DOCUMENTS

CN 103730616 A 4/2014
DE 102010024320 A1 12/2011
(Continued)

OTHER PUBLICATIONS

Observation by third parties concerning EP 3 582 989 application (Art. 115 EPC), Mar. 2, 2020.
(Continued)

*Primary Examiner* — Jacob B Marks
(74) *Attorney, Agent, or Firm* — GrowIP Law Group LLC

(57) ABSTRACT

The present disclosure relates to a battery structure for an electric vehicle. The battery structure comprises a battery case for at least one battery module and a protector including a top belt, a bottom belt and a core arranged between and interconnecting the top belt and the bottom belt. The top belt has a wavelike cross section.

13 Claims, 4 Drawing Sheets

(51) Int. Cl.
*H01M 10/613* (2014.01)
*H01M 10/625* (2014.01)
*H01M 10/647* (2014.01)
*H01M 10/6556* (2014.01)
*B60L 58/27* (2019.01)
*B60L 50/64* (2019.01)
*B60L 50/60* (2019.01)
*B60L 58/26* (2019.01)
*H01M 50/20* (2021.01)
*B60K 1/00* (2006.01)

(52) U.S. Cl.
CPC ........... *B60L 58/27* (2019.02); *H01M 10/613* (2015.04); *H01M 10/625* (2015.04); *H01M 10/647* (2015.04); *H01M 10/6556* (2015.04); *H01M 50/20* (2021.01); *B60K 2001/005* (2013.01); *B60K 2001/0438* (2013.01); *B60Y 2306/01* (2013.01); *B60Y 2306/05* (2013.01); *H01M 2220/20* (2013.01)

(56) References Cited

U.S. PATENT DOCUMENTS

| | | |
|---|---|---|
| 2012/0160088 A1 | 6/2012 | Rawlinson |
| 2014/0302279 A1 | 10/2014 | Pfaffelhuber et al. |
| 2015/0135939 A1 | 5/2015 | Rawlinson |
| 2015/0135940 A1 | 5/2015 | Rawlinson |
| 2015/0336452 A1 | 11/2015 | Decker |
| 2016/0272246 A1 | 9/2016 | Berger et al. |

FOREIGN PATENT DOCUMENTS

| | | |
|---|---|---|
| DE | 102012017879 A1 | 3/2014 |
| EP | 2623353 A1 | 8/2013 |
| EP | 2910394 A1 | 8/2015 |
| WO | 2014188259 A1 | 11/2014 |

OTHER PUBLICATIONS

International Search Report (ISR) and Written Opinion for PCT/EP2018/053354 dated May 17, 2018, pp. 1-12.

\* cited by examiner a)

b)

BATTERY STRUCTURE AND PROTECTOR

CROSS-REFERENCE TO RELATED APPLICATIONS

This application claims the benefit of the filing date of international PCT Application No. PCT/EP2018/053354, filed on Feb. 9, 2018 that in turn claims priority to Swiss Patent Application No. CH 00186/17, filed on Feb. 17, 2017, which are hereby incorporated by reference in their entirety.

FIELD OF THE INVENTION

The present disclosure relates to a battery structure for an electric vehicle and a protector for a battery pack.

BACKGROUND OF THE INVENTION

DE102015101096A1 was first published in July 2016 in the name of Porsche AG. It relates to a battery structure. The battery facilities include an underbody battery between a bottom plate and a floor. At least one deformation zone is foreseen to avoid unwanted damage to a battery of the underbody. The deformation zone is below the battery facilities. The bottom plate can deform upwards.

WO15077000A1 was first published in May 2015 in the name of Atieva Inc. It relates to a battery pack protection system for use with an electric vehicle in which the battery pack is mounted under the car. The system utilizes a plurality of deformable cooling conduits located between the lower surface of each of the batteries and the lower battery pack enclosure panel. A thermal insulator is interposed between the conduits and the lower enclosure panel. A layer of thermally conductive material may be included which is interposed between the cooling conduits and the thermal insulator and in contact with a lower surface of each of the cooling conduits.

The cooling conduits are configured to deform and absorb impact energy when an object, such as road debris, strikes the lower surface of the lower battery pack enclosure panel. Further protection may be achieved by positioning a ballistic shield, alone or with a layer of compressible material, under the bottom surface of the battery pack.

FR2977554A was first published in January 2013 in the name of Fior Concept. It relates to a vehicle having a frame which comprises a honeycomb shaped structure that forms a plate. A surface of an upper plate is rigidly connected to an upper surface of the plate. A surface of a bottom plate is rigidly connected to a lower surface of the plate. Resistant structures are protruded above a wheel notch and attached with the notch by a complete and rigid connection. An external resistant belt is attached with an external circumference of the plate by the complete and rigid connection and placed partially between the structures of passages of the wheels.

SUMMARY OF THE INVENTION

From the prior art, parts for the protection of battery packs arranged in the vehicle floor are known which often absorb the occurring energy by plastic deformation over a relatively large deformation path. The protectors known from the prior art are either made from metal or composite material and are not appropriate for absorbing high punctual impact loads.

One disadvantage of the systems known from the prior art is that a significant amount of space between the underride protection and the parts to be protected is consumed as the structure used to fulfill the requirements, i.e. depleting of the introduced energy without significant introduction of forces into the parts to be protected. Depending on the type of vehicle this can have a significant impact on at least one of the following parameters: Ground clearance, access height, head clearance, vehicle height, cross-sectional area.

Therefore, it is an object of the present disclosure to provide an improved protector for a battery structure which offers better performance for protecting of a battery structure in an underfloor of an electric vehicle, namely high local stress, e.g. due to impact by an immersible traffic bollard. It is a further object to provide a protector which is lighter and needs less space in height direction to deplete the occurring energy by elastic and/or plastic deformation.

The protector according to the present disclosure helps to prevent damage of at least one battery module arranged in an underfloor of an electric car. The protector normally comprises a top belt and a bottom belt and a there between arranged core interconnecting the top belt and the bottom belt. The top belt preferably has a waveform in at least one direction. Depending on the field of application, the waveform may extend in two directions arching from one beam to another beam effectively receiving and distributing high local load as described hereinafter in more detail. The protector according to the present disclosure offers optimized distribution of the occurring energy into the structure by a combination of elastic and/or plastic deformation. The top belt and the bottom belt, as well as the there-between arranged core, are preferably made from at least one out of the following group of materials: Aluminum, steel, fiber reinforced composite material, thermoplastic material.

In a preferred variation the top belt is made from aluminum and/or steel and/or thermoplastic material comprising short fibers, while the bottom belt is preferably made from fiber reinforced composite material comprising continuous fibers. The core is preferably made from honeycomb and/or foam. Depending on the field of application, other combinations can be used.

A preferred selection of parameters to optimize the structure are: Shape of the cross-section of the wave, shape (curvature) of the wave, core material, chamber height, wall thickness, belt material.

In a preferred variation the battery structure for an electric vehicle comprises a battery case encompassing at least one battery module and a protector. The protector comprises a top belt and a bottom belt and a core arranged between and interconnecting the top belt and the bottom belt. The top belt preferably has a wavelike cross-section extending in at least one direction. The wavelike cross-section of the top belt may extend in longitudinal and/or transverse direction of the electric vehicle resulting in a wavelike top belt, wherein the waves extend in one and/or two directions simultaneously. The waves can be regular or irregular. The waves of the top belt can extend in two directions if appropriate.

The protector is preferably interconnected to at least longitudinal and/or at least one transverse beam of the battery case. In a variation the longitudinal and the transverse beams are arranged grid-like. The top belt can be interconnected to a frame of the battery case. The protector is preferably arranged below a lower sled wall of the battery case housing with the at least one battery module inside. One aim is that the risk that an impacting object can reach the lower sled wall is significantly reduced.

The top belt comprises, with respect to the core, elevations (thicker areas of core) and thereto alternating depressions (thinner area of core) arranged in a wavelike structure. The depressions and elevations span across the beams, respectively the frame of the battery case, in an arch-like manner resulting in a very efficient structure, especially in the case of punctual loads occurring from the outside (opposite side of the protector). The top belt in the area of at least one depression can be directly interconnected to the bottom belt. The top belt in the area of at least one depression can be directly connected to the bottom belt. Alternatively or in addition, the top belt can be in the area of at least one depression indirectly connected to the bottom belt, e.g. via a section of the same or a different core. Good results can be achieved if the core is a honeycomb, e.g. made from aluminum, steel or injection molded thermoplastic material, and/or a foam. The bottom belt preferably has a primarily flat structure, especially in the case that it provides the outer layer of the underfloor. Stiffening corrugations may be applied if necessary as part of the structure and/or as separate elements. The core can be made from an isolating material. If appropriate at least one of the depressions can be used for conveying of a fluid for cooling and/or heating of the at least one battery module.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described invention will be more fully understood from the detailed description given herein below and the accompanying drawings which should not be considered limiting to the invention described in the appended claims. The drawings are showing:

DESCRIPTION OF THE EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
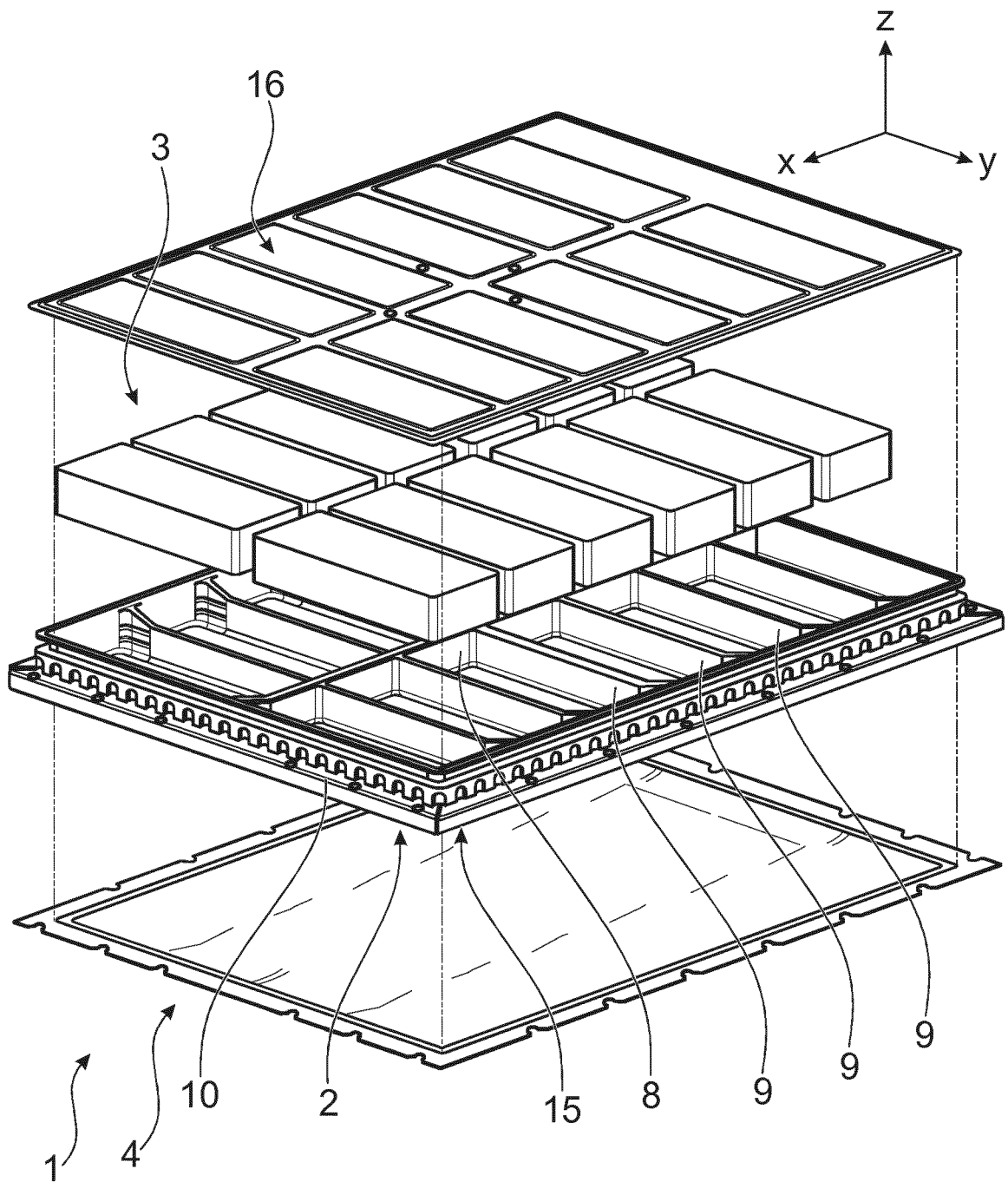
FIG. 1 a battery structure according to the present disclosure.
Figure 2:
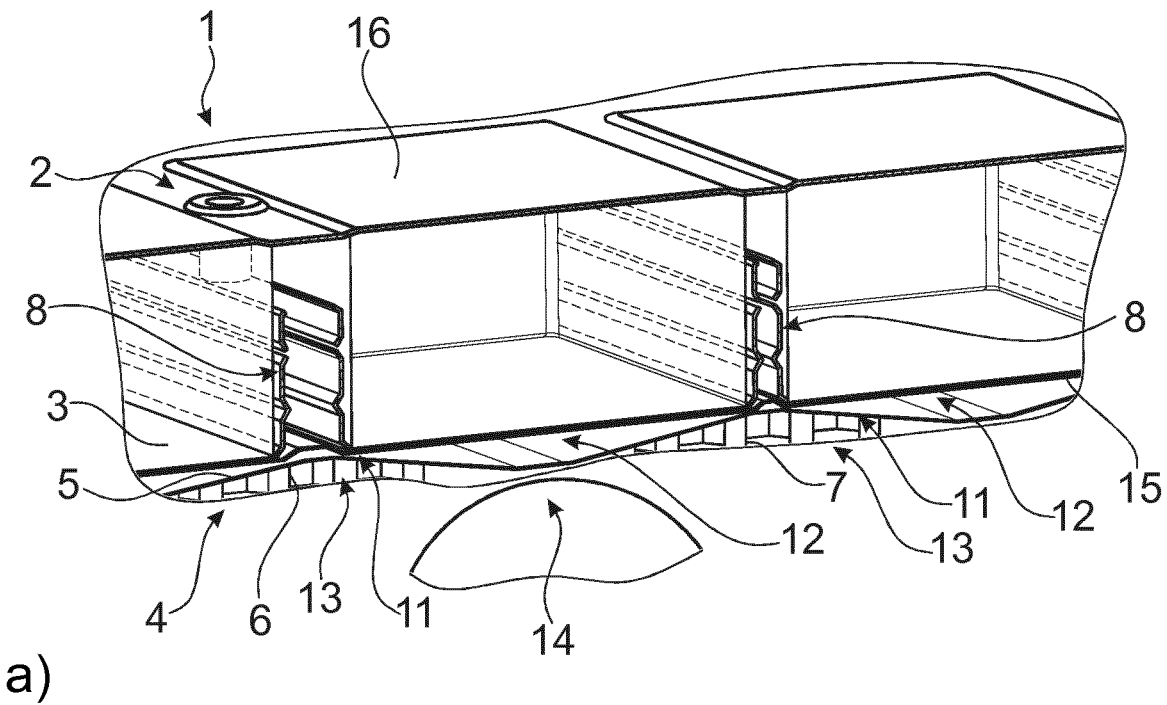
FIG. 2 a longitudinal and a transverse section view across a battery case according to the present disclosure.
Figure 2:
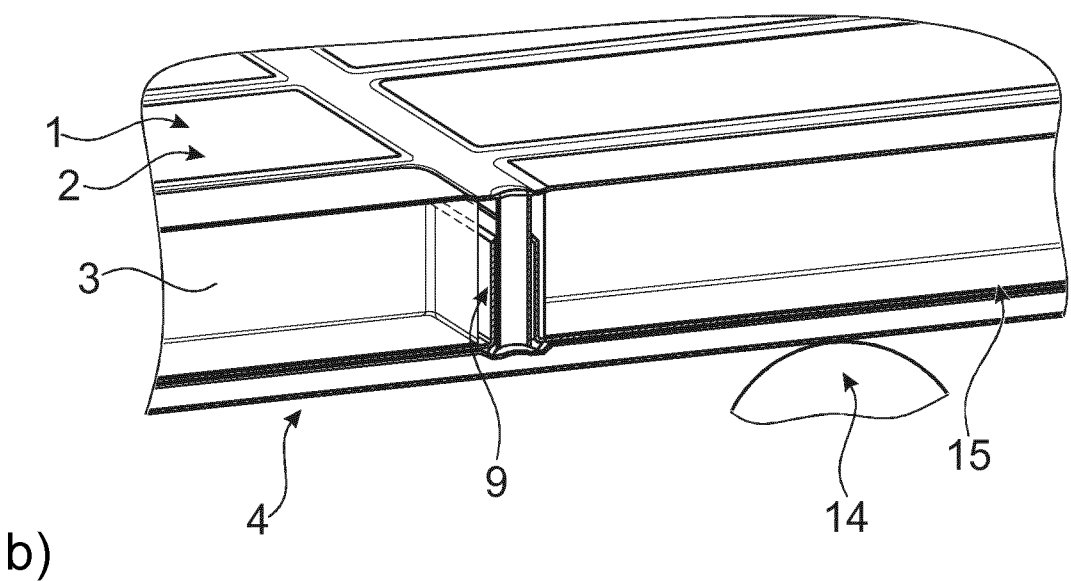
Figure 3:
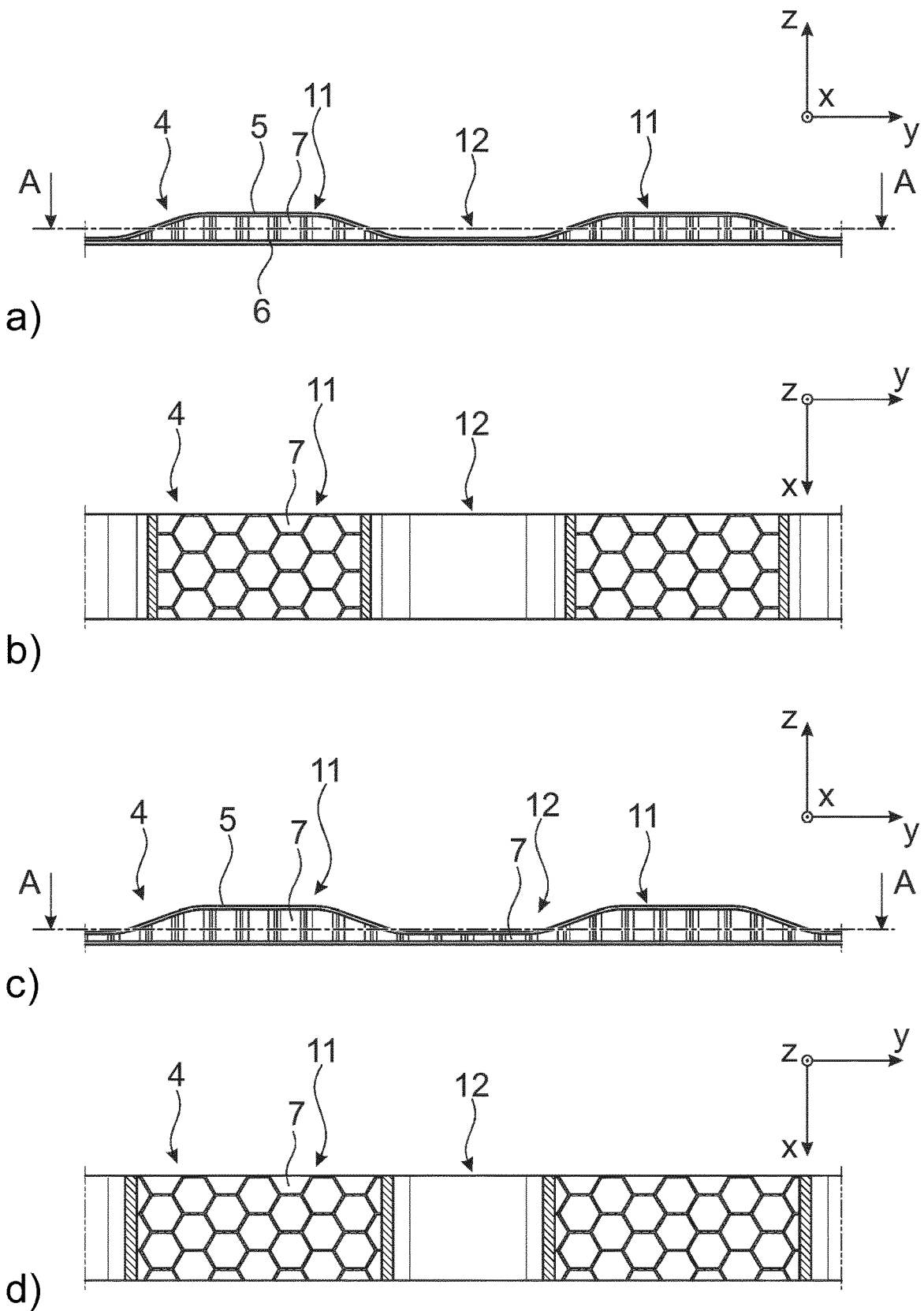
FIG. 3 a first and a second embodiment of a protector in a first and in a second section view.
Figure 4:
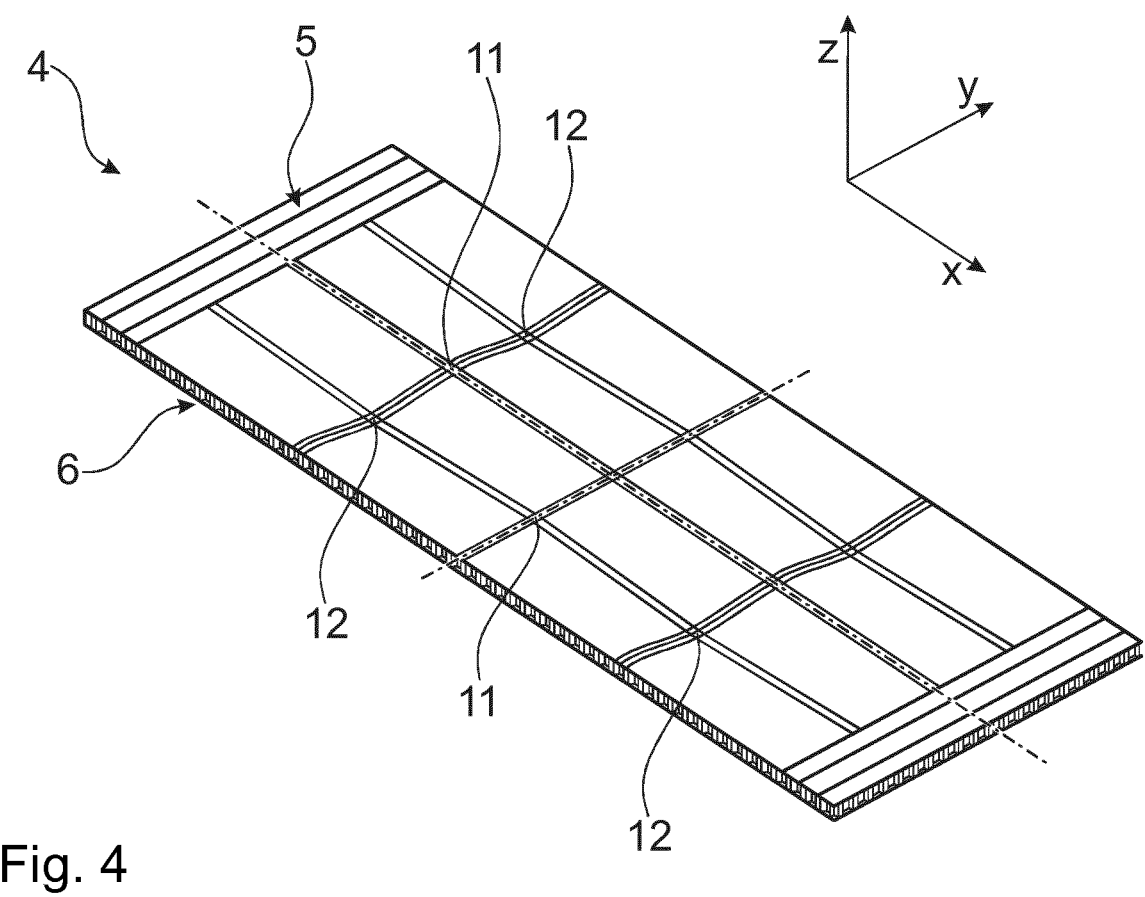
FIG. 4 a third embodiment of a protector.

FIG. 1 shows a battery structure 1 in an exploded view from below. FIGS. 2a and 2b schematically show an impact of an object 14 into a battery structure 1 from below. FIG. 3a through 3d show cross-section views of a first and a second variation of a protector 4 from the side along section line A-A. FIG. 4 shows a third variation of a protector 4 in a perspective view.

As shown in FIG. 1, the battery structure 1 comprises a battery case 2 for at least one battery module 3 and a protector 4. The elements are shown in a disassembled, exploded manner. The assembly is schematically indicated by dotted lines. As shown for example in FIG. 2a and FIG. 3, the protector 4 comprises a top belt 5 and a bottom belt 6 and a core 7 arranged between and interconnecting the top belt 5 and the bottom belt 6 at least in certain areas. In the shown variation, the core is a honeycomb, wherein the cells of the honeycomb extend in a vertical direction (i.e., z-direction). As schematically indicated in FIG. 1 the protector 4, namely the top belt 5, can be interconnected to a frame 10 of the battery case 2.

As shown in FIG. 2a, the top belt 5 of the illustrated variation has a wavelike cross-section. The top belts 5 are interconnected to longitudinal beams 8 of the battery case 2.

The top belt 5 comprises elevations 11 and thereto alternating depressions 12 forming waves 13, which are arranged in a regular manner. The waves 13 are here extending in the x-direction only. Other arrangements are possible.

In the variation as shown in FIG. 2a, respectively the section view according to FIG. 3a, the top belt 5 in the area of the depressions 12 is directly interconnected to the bottom belt 6, which has an in principle flat design. As shown in the section view according to FIG. 3c, the top belt 5 can be alternatively or in addition in the area the depressions 12 indirectly connected to the bottom belt 6 via the core 7.

FIG. 3b shows a section view along section line A-A according to FIG. 3a, and FIG. 3d shows a section view along section line A-A according to FIG. 3c.

For better temperature control of the at least one battery module, the core 7 can be made from an isolating material such as foam. If appropriate at least one of the depressions 12 is used for conveying of a fluid for cooling and/or heating of the at least one battery module.

FIG. 4 shows a further variation of a protector 4 in a perspective view from above. The top belt 5 has a wave-structure extending in two directions (x, y) simultaneously. The bottom belt 6 (not shown in detail) has a flat design. Depending on the field of application, other possibilities exist. In an area where the longitudinal and the transverse beams 8, 9 connect (indicated by dashed lines) the top belt 5 has a flat design. Compared to the prior art, the dome-like depressions 12 offer very high stiffness and energy consumption capability especially in the case of punctual impact loads from below 8 (i.e., z-direction).

The words used in the specification are words of description rather than limitation, and it is understood that various changes may be made without departing from the spirit and scope of the invention.

The invention claimed is:

1. A battery structure for an electric vehicle comprising:
   a. a battery case for at least one battery module; and
   b. a protector arranged below a lower sled wall of a battery case housing with the at least one battery module inside comprising
      i. a top belt,
      ii. a bottom belt, and
      iii. a core arranged between and interconnecting the top belt and the bottom belt, wherein
   c. the top belt has a wavelike cross section.

2. The battery structure according to claim 1, wherein the wavelike cross-section of the top belt extends in a longitudinal and/or a transverse direction of the electric vehicle.

3. The battery structure according to claim 1, wherein the top belt is interconnected to at least one of a longitudinal beam and a transverse beam of the battery case.

4. The battery structure according to claim 1, wherein the top belt is interconnected to a frame of the battery case.

5. The battery structure according to claim 4, wherein the top belt is interconnected to at least one of a longitudinal beam, a transverse beam, and the frame of the battery case across the lower sled wall of the battery case.

6. The battery structure according to claim 1, wherein the top belt comprises elevations and thereto alternating depressions.

7. The battery structure according to claim 6, wherein the top belt in an area of at least one of the alternating depressions is directly interconnected to the bottom belt.

8. The battery structure according to claim 7, wherein the top belt in the area of the at least one of the alternating depressions is directly connected to the bottom belt.

9. The battery structure according to claim 6, wherein the top belt in an area of at least one of the alternating depressions is indirectly connected to the bottom belt via the core.

10. The battery structure according to claim 1, wherein the core is at least one of a honeycomb and a foam.

11. The battery structure according to claim 1, wherein the core is made from an isolating material.

12. The battery structure according to claim 6, wherein at least one of the alternating depressions is used for conveying of a fluid for at least one of cooling and heating of the at least one battery module.

13. A protector for the battery structure according to claim 1.

* * * * *